United States Patent [19]
Forbes et al.

[11] Patent Number: 5,646,391
[45] Date of Patent: *Jul. 8, 1997

[54] OPTICAL ASSEMBLY FOR CONTROLLING BEAM SIZE IN BAR CODE SCANNERS

[75] Inventors: Gregory William Forbes, Sydney, Australia; Anna M. Quinn, Rochester; Jay M. Eastman, Pittsford, both of N.Y.

[73] Assignee: PSC, Inc., Webster, N.Y.

[ * ] Notice: The term of this patent shall not extend beyond the expiration date of Pat. No. 5,386,105.

[21] Appl. No.: 438,821

[22] Filed: May 11, 1995

[51] Int. Cl.$^6$ .................................................. G06K 7/10
[52] U.S. Cl. ........................................ 235/462; 359/558
[58] Field of Search ................................ 235/462, 472, 235/454; 359/205, 207, 639, 708, 710, 721, 558

[56] References Cited

U.S. PATENT DOCUMENTS

| | | | |
|---|---|---|---|
| 4,808,804 | 2/1989 | Krichever et al. | 235/462 |
| 5,080,456 | 1/1992 | Katz et al. | 359/214 |
| 5,332,892 | 7/1994 | Li et al. | 235/462 |
| 5,386,105 | 1/1995 | Quinn et al. | 235/462 |
| 5,438,187 | 8/1995 | Reddersen et al. | 235/462 |

OTHER PUBLICATIONS

L. W. Casperson, How Phase Plates Transform and Control Laser Beams, May, 1994 pp. 223–228.

*Primary Examiner*—Donald T. Hajec
*Assistant Examiner*—Michael G. Lee
*Attorney, Agent, or Firm*—Wolf, Greenfield & Sacks, P.C.

[57] ABSTRACT

In order to control the width of the scanning beam in the scanning direction over a significant range in front of the scanner, an optical assembly including a phase mask is utilized through which the beam passes after being configured into curved wavefronts, as by a lens which provides a focus in the vicinity of the far end of the range. The F/ number of the optical assembly is high and the cone of the beam in the scanning direction is small, for example, less than 5°. The mask is preferably transparent and has a region which may be rectangular, elliptical or circular forming a step through which the center of the beam passes which imposes a phase change with respect to the phase of the wavefronts which do not propagate via the region. The phase change may be uniform or in the form of a weak quadratic phase variation in this region of the mask which changes phase and thus slightly refocuses the beam. The transmissivity of the region may also be varied and reduced with respect to the transmissivity of the mask outside of the region. The beam may be scanned via a scanning mirror or by scanning the optical assembly.

23 Claims, 4 Drawing Sheets

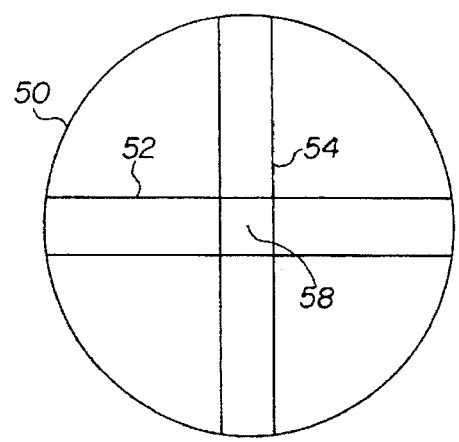
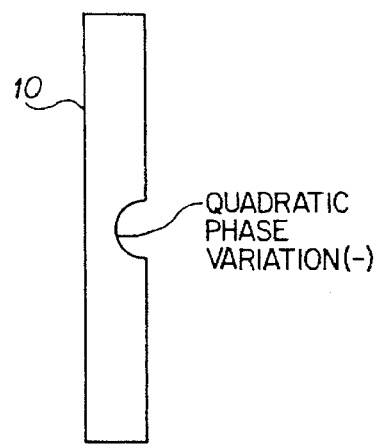
FIG. 4   FIG. 5
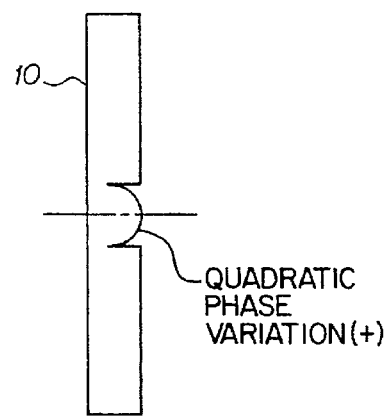
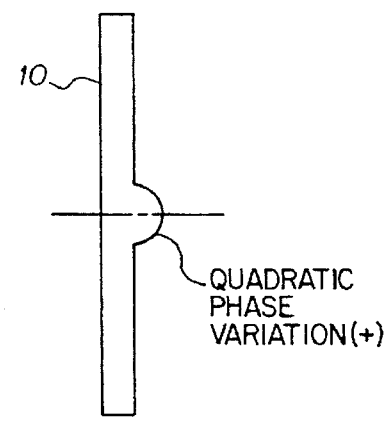
FIG. 6   FIG. 7
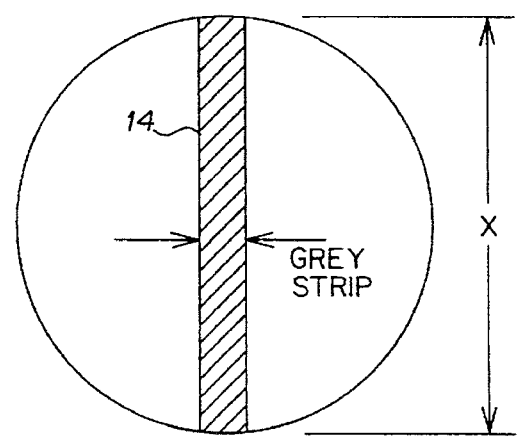
FIG. 8

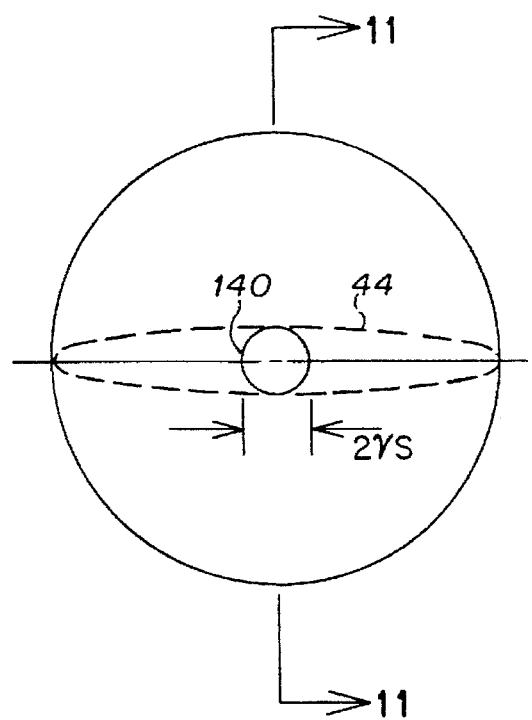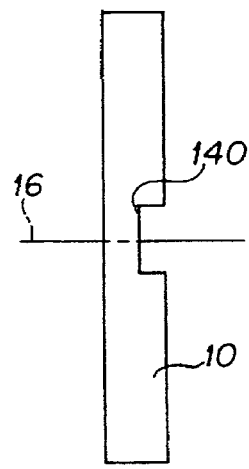
FIG. 10　　　　FIG. 11
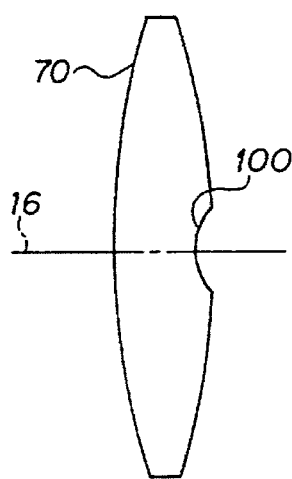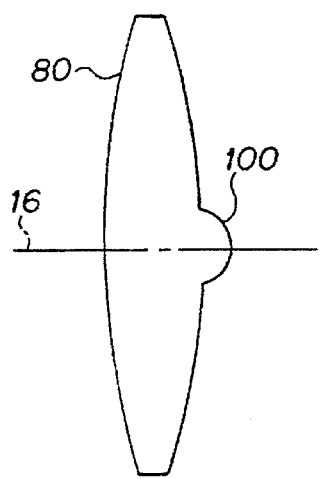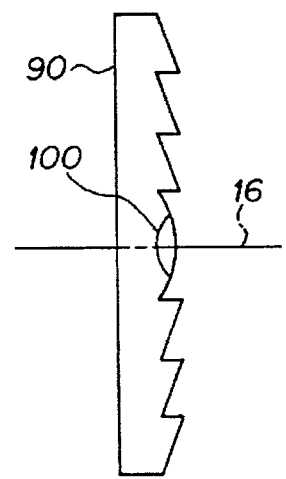
FIG. 12　　　FIG. 13　　　FIG. 14

OPTICAL ASSEMBLY FOR CONTROLLING BEAM SIZE IN BAR CODE SCANNERS

BACKGROUND OF THE INVENTION

1. Field of the Invention

The present invention relates to bar code scanning systems, and particularly to optics utilized in the projection of a laser scanning beam towards a bar code for controlling the width of the beam in the scanning direction over a significant range away from the scanner where bar codes may be located for reading.

The system is especially suitable for use in an optical assembly for a bar code scanner comprising a laser, for example, a laser diode, and optical elements which form and project the beam generated by the laser so that the beam, across its waist and over a range of distances where bar codes may be located for scanning and reading, is less than the width of the code, so as to enable bars and spaces of the code to be resolved from the return light from the code which is detected by a photodetector in the bar code scanner thereby optimizing scanner performance for a predetermined minimum bar or space width. This invention may be used to optimize scanner performance over desired reading range in an application for which the minimum bar and space widths are known. For example, a significant range may be a distance of about 30 inches from the scanner for a typical UPC product code with minimum bar and space widths on the order of 10 mils.

It is a feature of the invention to provide in an optical assembly which launches and projects the scanning beam via optical elements which form and control the phase of the beam as it is launched so as to control and limit the size of the beam at least across its waist (as measured along the scanning direction) over a significant scanning range in front of the scanner.

2. Description of the Prior Art

Phase masks and particularly masks having apertures have been used to condense optical beams so as to provide high resolution at locations close to the mask. Such phase masks with circular or rectangular apertures have been proposed for optical disc recording and reading to provide so-called "super resolved" beam spots. See Hirose, et al., U.S. Pat. No. 5,121,378, issued Jun. 9, 1992. Phase plates have been proposed to provide phase or amplitude changes for coalescing lobes of a laser beam pattern and enhancing intensity of laser beams. See an article by L. W. Casperson, which appeared in Laser Focus World magazine for May 1994, pages 223–228 which describes various phase mask or plate systems. In order to control the size of a scanning beam over a large, significant range in front of the scanner, it has been proposed to utilize apertures with predetermined sizes and in predetermined space relationships with the source of the laser beam. The apertures may have different transmissivity in different regions thereof. See, Eastman, et al., U.S. Pat. No. 5,200,597, issued Apr. 6, 1993 and Eastman and Quinn, U.S. Pat. No. 5,386,105, issued Jan. 31, 1995. Special lenses called axicons which focus apodized laser beams have also been proposed in order to control the size of a laser scanning spot. See Marom, U.S. Pat. No. 5,331,143, issued Jul. 19, 1994. Multiple overlapping beams have been also proposed. See Marom et al. U.S. Pat. No. 5,315,095, issued May 24, 1994.

SUMMARY OF THE INVENTION

The principal object of the present invention is to provide improved optics suitable for use as an optical assembly in a laser bar code scanner which provides improved reading performance by controlling the shape and particularly the width of a scanning beam in the scanning direction, which direction is across the bars of a bar code.

Another object of the invention is to provide an improved optical assembly in which the wavefronts of a laser beam are formed and modified in phase so that diffraction effects control the size of the beam at least in the scanning direction over a significant range in front of the scanner.

It is a still further object of the invention to provide an improved optical assembly for bar code scanners which controls beam size without significant apodization or intensity reduction of the beam.

It is a still further object of the present invention to provide an improved optical assembly for projecting beams which are scanned across a bar code and which assembly has a large F/ number, for example, exceeding F8 and a small Fresnel number on order of about 1, where the Fresnel number is the radius of the beam at launching from the optical assembly squared divided by the product of the wavelength of the light of the beam and the distance from the assembly to the point at which the beam is focused. The invention enables an approximately constant beam size to be maintained over an extended range so as to permit bar codes of about $10/1000$ths of an inch (10 mils) (narrowest width of the bars and spaces thereof) to be resolved over ranges from two to thirty inches from the scanner, and generally to optimize the performance of scanners in reading bar codes of other sizes at other ranges.

It is a still further object of the present invention to provide an improved optical assembly for launching and projecting laser beams for scanning bar codes which utilizes optical elements of simple design and which may be fabricated at low cost.

Briefly described, an optical assembly for a bar code scanner in accordance with the invention, provides a laser beam, which beam scans across the bars and spaces of the code in a scanning direction. The assembly includes the laser beam source which provides the laser beam which propagates outwardly from the scanner over a range having an inner end and outer end closer and further from the scanner, in which range the bar code can be located for scanning and reading. The beam is formed into wavefronts having a curvature which is weakly convex with respect to a point spaced in the vicinity of the outer ends of the range. In order to form the beam with such wavefronts, a lens may be provided which converges an outwardly diverging beam at a point along its optical axis in the vicinity of the outer ends of the range. This may be at or inwardly or outwardly of the desired outer end of the range. The phase of the beam as it propagates into the inner end of the range, that is as it is launched, is changed by a phase plate or mask which in at least a region in the center portion of the beam, advances or delays the phase of the wavefronts. An element which introduces quadratic (power of two) phase variation, serving effectively as an extremely weak lens, may be provided in this region to refocus a portion of the beam. The region may also have different transmissivity from the rest of the mask. The optical assembly thus provides control of a plurality of parameters including the width of the beam as it is launched, the size of the region, the transmissivity of the region, the phase change provided by the region and the location of the focus of light passing through the region. All of these parameters affect the Fresnel number and the length and angular divergence of a cone of light which projects over the range where bar code scanning may be carried out and controls the width of the beam, at least in the scanning direction.

BRIEF DESCRIPTION OF THE DRAWINGS

The foregoing and other objects, advantages and features of the invention as well as presently preferred embodiments thereof, will become more apparent from a reading of the following description in connection with the accompanying drawings in which:

FIG. 4 is a front view of the mask taken along the line 4—4 in FIG. 3;

FIGS. 5, 6 and 7 illustrate phase masks with different types of quadratic phase variations in a region along the center of the mask;

FIG. 8 is a view similar to FIG. 4 where the region along the center of a mask through which the beam passes is of lower transmissivity than the rest of the mask;

FIGS. 10 and 11 are views similar to FIGS. 2 and 3 wherein the phase mask is radially symmetric, illustrated as circular; and FIGS. 12, 13, and 14 are views similar to FIGS. 5 and 7 wherein the focusing lens and phase mask are integrated with each other; the lens shown in FIG. 14 being a diffractive, zone plate lens.

DETAILED DESCRIPTION

It has been discovered in accordance with the invention that the optical field amplitude and phase of a beam which is launched across a plane containing a phase mask may be expressed as follows.

$$S(x) = e^{-(\frac{x}{\omega})^2} \left[ e^{-i(\frac{\pi x^2}{\lambda f})} \Omega\left(\frac{x}{s}\right) - e^{-i(\frac{\pi x^2}{\lambda f})} \Omega\left(\frac{x}{\gamma s}\right) + A e^{-i(\frac{\pi x^2}{\lambda \xi f})} \Omega\left(\frac{x}{\gamma s}\right) \right]$$

Figure 1:
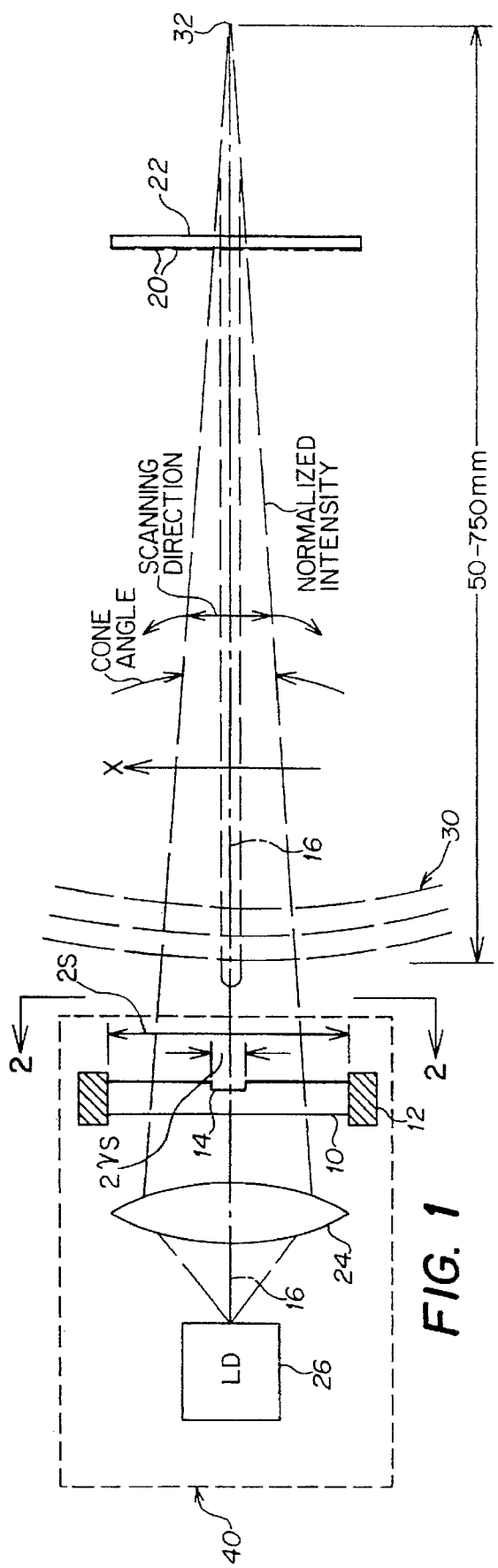
FIG. 1 is a diagram illustrating schematically an optical assembly provided by the invention and its application to bar code scanning.

In this equation, x is the coordinate in the scanning direction of the beam. The beam has a Gaussian profile as expressed in this equation where ω is the Gaussian width of the beam in a plane through the front surface of a phase mask provided by an optical element 10, providing the mask (which is a clear plate as shown in FIG. 1). The half width of the optical element measured from its center (i.e. its radius) in the scanning direction is s. The periphery of the optical element is mounted in a holder 12 which defines a circular aperture for the optical element. The plate periphery is located in the holder 12, the inner periphery of which coincides with the outer periphery of the optical element 10 and is the aperture of an optical assembly 40. A rectangular region 14 in the optical element along a central diameter has a half width of γs. An optical axis 16 of the assembly 40 runs through the center of the rectangular region. The center half width of the rectangular region 14 may be called the center half width. The rectangular region 14 (see also FIG. 2) extends vertically in the same direction as the bars 20 of a bar code on a label 22, which is disposed within a range indicated as 50 to 750 mm in front of the optical assembly.

The optical assembly has a lens 24 which takes the diverging beam from a laser, particularly a laser diode 26, and forms this beam into curved wavefronts 30 which converge to a point indicated at 32 at the far end of the range. (FIGS. 11, 12 and 14 show cases in which the lens (70-FIG. 12, 80-FIG. 13 and a diffractive zone plate lens-90 and the phase mask 100-FIG. 14, which defines a weak cylindrical quadratic phase variation, are integral with each other.)

The assembly 40 may be located on a board and directed toward a scanning mirror as is the case of the optical assembly including the laser in the Eastman, et al. U.S. Pat. No. 5,200,597, referenced above. Alternatively, the assembly 40 may be mounted on flexures and oscillated as a whole so as to scan the beam which is directly launched therefrom. Such assemblies are shown in Eastman, U.S. Pat. Nos. 5,015,831, issued May 14, 1991, and 5,115,120, issued May 19, 1992 and are embodied in optical and electronic modules known as scan engines.

The inner end of the range may be at the output window of the scan engine which starts approximately 50 mm from a plane at the front surface of the optical element 10, where the beam is launched. The focal position, as measured from this plane, is f in the above equation. The wavelength of the light is λ which from a typical laser diode may be 0.67 microns. The Ω terms in the equation are rectangular functions that are unity when its argument is <1.0 and zero for arguments ≧1.0. The first term of the equation represents the Gaussian Beam as limited by the physical aperture of the lens. The second and third terms effectively replace the central region of the beam (xγ≦s) with a new term with modified complex amplitude (due to variable A) and modified curvature (due to variable ξ). Since the amplitude A is a complex quantity, it represents both a change in the amplitude of oscillation (i.e. a change in the modulus of A) and a constant change in phase, corresponding to a "piston" in phase. The second term where the exponent is a complex quantity, represents the focusing of the beam after it exits lens 24.

$$e^{-i(\frac{\pi x^2}{\lambda f})}$$

Thus the first Ω term $$\left(\Omega\left(\frac{x}{s}\right)\right)$$

designates the half width of the outer periphery of the beam at the lens, which corresponds to the constant s. For values of x>s the beam is cut off by the lens aperture. γs represents the half width of the rectangular region 14. For values of x>γs only the amplitude of the beam represented by the first term, $$e^{-(\frac{x}{\omega})^2} e^{-i(\frac{\pi x^2}{\lambda f})}$$

is launched, since the rectangular region 14 is not present outside of the region x>γs.

In the vicinity of the rectangular region 14 the amplitude and phase of the beam are modified by the mask. The equation effectively removes the central region of the beam and replaces it with a beam of modified amplitude and phase. A is the complex amplitude of the field in the rectangular region 14 and the quadratic phase in the rectangular region 14 is represented by the term:

$$\left(\frac{x^2}{\lambda \xi f}\right)$$

In practice the amplitude A is related to the transmissivity of the rectangular region. When the modulus of A is equal to 1 the region is clear as is the rest of the mask 10. The mask in one embodiment of the invention is preferably a piece of optical glass. The modulus of A is less than 1 when the transmissivity of the rectangular region is lower than the rest of the mask as shown in FIG. 8. The height or depth of the rectangular region determines the phase delay or advance and is represented by the argument of A, defined in terms of radians of phase. The variable $\xi$ represents refocusing of the beam due to a quadratic phase variation and corresponds conceptually to a very weak lens which changes the curvature and effectively changes the focus of the wavefronts in that portion of the beam passing through the rectangular region 14. The quadratic phase variation, which is on the order of a wavelength of light, may be cylindrical and either positive or negative or it may project from the front surface of the optical element 10 as shown in exaggerated form respectively in FIGS. 5, 6 and 7. The ratio of the center of curvature of the wavefront with respect to the center of curvature of the lens 24 is a dimensionless number represented by the Greek letter $\xi$. By varying the parameters, namely the width of the mask 10 (parameter s in the equation), the Gaussian width of the beam as it passes through the mask 10 ($\omega$ in the equation), the focus position (f in the equation), the center width of the rectangular region 14 ($\gamma$s in the equation) and the transmissivity A, the phase which is the argument of A, and $\xi$, the ratio of wavefront curvatures, the light beam launched from the assembly 14 can be modified (over the range, say 50 to 750 mm). Far field diffraction effects cause the beam width to be maintained and to be minimized at the far end of the range where the worst case beam width is usually located.

The following examples define the parameters of different optical assemblies wherein beam shaping and minimization of the width of the beam in the scanning direction can take place. It will be apparent that such minimization is directly contrary to systems which utilize apodization or apertures alone. As a example, an uniformly filled aperture of even 0.26 mm results in a maximum width at the end of a 750 mm range of approximately 0.73 mm. Since bar codes which may be encountered may have bar or space widths of less than 0.30 mm, it will be difficult to resolve such codes, notwithstanding that they may be located within the desirable reading range of 750 mm from the scanner.

Figure 2:
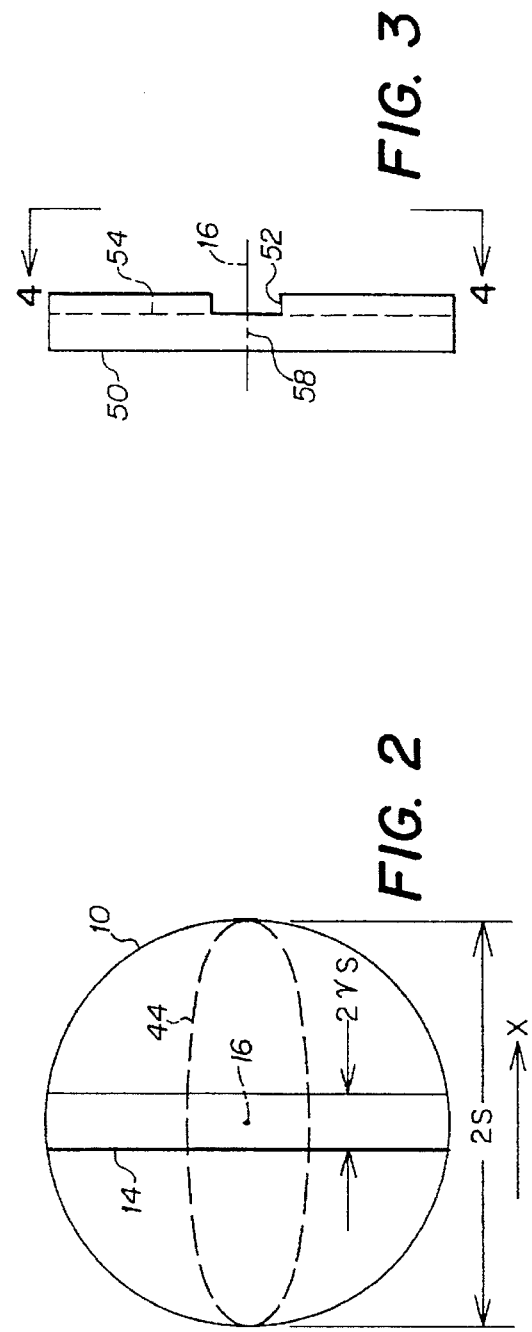
FIG. 2 is a view of the assembly taken along the line 2—2 when viewed in the direction of the arrows.

A pure Gaussian beam, even if focused at the end of the range but without a phase mask such as the mask 10, has a width of approximately 0.46 mm, again larger than desired. The following example provides a beam of approximately 0.36 mm: s=1.03 mm, $\omega$=0.49 mm (this is the Gaussian width to the 1/e amplitude, where e is the base of Napierian logarithms). The focus position is 926 mm which is beyond the 750 mm range. The rectangular region center half width $\gamma$s is 0.159 mm. The mask is entirely clear (A is equal to 1 in magnitude). The argument of A is equal to 1.562 radians. As shown in FIGS. 1 and 2 there is no quadratic phase variation in the region 14 so that $\xi$ is equal to 1.

As another example a beam width of approximately 0.3 mm is obtained at the far end of the range with a phase mask where s is equal to 1.359 mm, the beam has a Gaussian width $\omega$ of 0.6719 mm, the focal position f is 754 mm from the plane at the front of the mask. The center half width of the rectangular region 14 is 0.1596 mm. There is some graying or reduction of transmissivity in the rectangular region 14 so that A is equal to d1.524. The argument of A is 1.990 radians. There is no quadratic phase variation and $\xi$ is equal to 1.

Another example which provides a maximum width of approximately 0.3 mm at the far end of the range but without the need for a reduction in transmissivity and the loss of energy of the beam has the following parameters: s=1.24 mm, Gaussian width of the beam $\omega$=0.597 mm. The focal position is 784 mm from the front of the mask. The center half width of the rectangular $\gamma$s region 14 is 0.1954 mm. A is 1 magnitude and the argument of A is 1.267 radians. There is a quadratic phase variation. The factor $\xi$ is 0.214 (see FIG. 6) thereby bringing the focus of the center region of the beam closer to the optical assembly 40.

Still another example of an optical assembly which provides a maximum beam width at 750 mm of approximately 0.3 mm in the scanning direction, utilizes a mask having a half width s of 1.227 mm, a beam having a Gaussian width $\omega$ of 0.612 mm, a focal position f of 767 mm, a center half width $\gamma$s of 0.193 mm and $\xi$ is 0.277 mm. The magnitude of A is 1 so that there is no loss of transmissivity in the rectangular region 14. The quadratic phase variation has even greater positive power than in the previous example, $\xi$ being 0.277. The quadratic phase variation corresponds to positive otpical power because the focus moves closer to the laser diode assembly.

Figure 9:
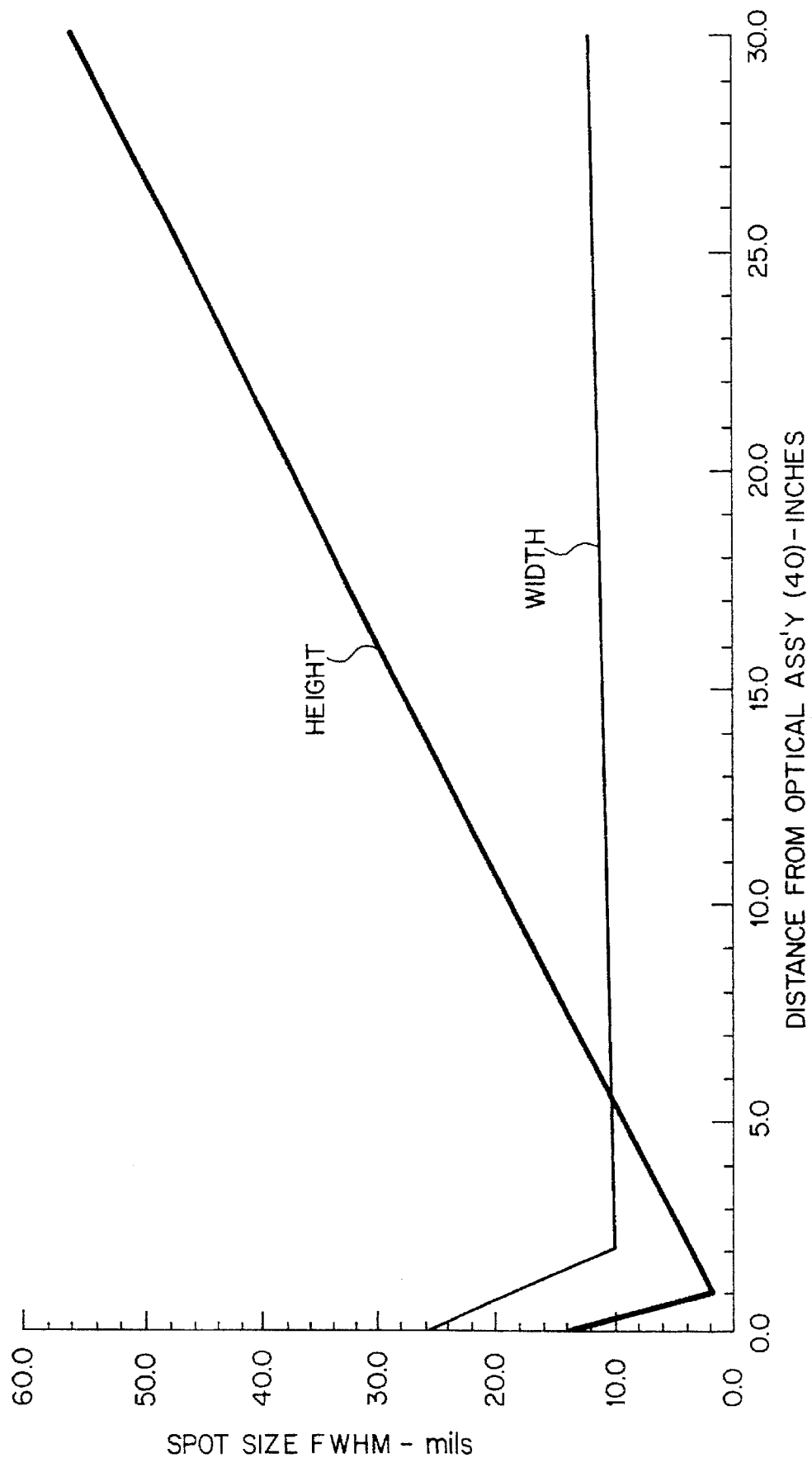
FIG. 9 is a chart illustrating the height and width of the scanning beam (width being in the scanning direction and the height being in the direction of the bars of the code) for an optical assembly of the type illustrated in the previous figures.

In terms of the distance from the assembly 40 over which the beam width is maintained at approximately 10 mils in its width is illustrated in FIG. 9. The height of the beam tends to grow in the far field because the length of the rectangular region is quite wide. The effect on phase follows in the height dimension in relationships described in Eastman, et al. U.S. Pat. 5,200,597, referenced above and is shown in the curve labeled height in FIG. 9.

Figure 3:
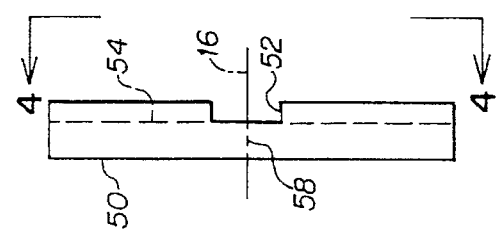
FIG. 3 is a side view of a phase mask which may be used in the optical assembly in accordance with another embodiment of the invention.

In the event that the height dimension is also to be controlled, a mask 50 such as shown in FIGS. 3 and 4 may be used. Here, there are two rectangular regions. The horizontal region 52 defines the height or vertical dimension of the beam because the beam elipse flips 90° through focus. It is assumed that the beam from the laser diode is elliptical as shown by the dashed ellipse 44 in FIG. 2. Then, as explained in the Eastman, et al. U.S. Pat. No. 5,200,597, the beam flips 90° so that its width in the scanning direction is determined by the rectangular regions 14 or in the case of FIG. 4 by the vertical rectangular region 54. In the region 58, where the two rectangular regions 52 and 54 intersect, their depth add so as to provide a phase advance equal to the sum of the phase advance provided by each of the rectangular regions alone. Then, both the height and the width of the beam over the scanning range is controlled.

The region 14 may be the radially symmetric, such as circular or shown in FIGS. 10 and 11. The same principles as discussed above apply to this radially symmetric case.

From the foregoing description, it will be apparent that there has been provided improved apparatus for use in bar code scanners which controls the size of the scanning beam, particularly in the scanning direction so as to enable the beam to read bar codes of minimum bar and space width over a wide scanning range. Variations and modifications in the herein described systems including designs of the phase masks which may have different delays in different regions in order to fine tune the spot size of the scanning beam will present themselves to those skilled in the art. Accordingly, the foregoing description should be taken as illustrative and not in a limiting sense.

What is claimed is:

1. An optical assembly for a bar code scanner which provides a laser beam which has a dimension in a scanning direction which the beam scans across the bars of the code, said assembly comprising a laser beam source which propagates outwardly from the scanner over a range having inner and outer ends closer and further from the scanner in which range the bar code can be located for scanning and reading, means for forming said beam into wavefronts curved convexly with respect to a point spaced in the vicinity of the outer end of said range, and a masking member for altering a phase or amplitude of a central portion of the beam, the member having at least one centrally located transmission mask for performing the phase or amplitude altering to adjust the width of the beam in the scanning direction so as to resolve bars not exceeding a minimum width or being a minimum distance from one another.

2. The assembly according to claim 1, wherein said masking member is operative to change the phase of the portion of said beam.

3. The assembly according to claim 1, wherein said masking member is operative to change the amplitude of the portion of said beam.

4. The assembly according to claim 1 where said masking member is operative to change both the phase and amplitude of the portion of said beam.

5. The assembly according to claim 1, wherein said masking member comprises, at most, two centrally located transmission masks which alter the beam so that the beam width in said scanning direction decreases between said outer and inner ends of said range.

6. The assembly according to claim 1, wherein said forming means includes means for focusing said beam into a cone having an optical axis, said cone in a direction across said scanning direction enclosing an angle having an apex at said point, said angle not exceeding about five degrees.

7. The assembly according to claim 1, wherein said masking member is transparent.

8. The assembly according to claim 7, in which the transparency of said masking member is reduced within said at least one transmission mask so that said mask is less transparent in said region than elsewhere therein.

9. The assembly according to claim 1, wherein said masking member is an element of optically transmissive material and said at least one transmission mask being of predetermined depth thereby modifying the phase of the wavefronts of said beam which is launched via said at least one transmission mask with respect to the phase of the wavefronts of said beam launched from said masking member outside of said at least one transmission mask.

10. The assembly according to claim 9, wherein said at least one transmission mask has a width and length, said width being in the scanning direction.

11. The assembly according to claim 9, wherein said at least one transmission mask is radially symmetric.

12. The assembly according to claim 11, wherein said at least one radially symmetric transmission mask is circular.

13. The assembly according to claim 9, wherein the transmissivity of said masking member in said at least one transmission mask is different from the transmissivity of said masking member outside said at least one transmission mask.

14. The assembly according to claim 9 further comprising a quadratic phase variation element in said region.

15. The assembly according to claim 14, wherein said quadratic phase variation element adds either a positive or negative wavefront curvature to said beam.

16. The system according to claim 14, wherein said forming means is a lens, disposed between said masking member and said source, having a focus at said point, and said quadratic phase variation element in said at least one transmission mask diffracts said central portion of said beam transmitted via said at least one transmission mask at a different point along an optical axis.

17. The assembly according to claim 9, wherein said at least one transmission mask is rectangular.

18. The assembly according to claim 17, wherein said masking member comprises a first rectangular transmission mask, and a second rectangular transmission mask which extends transversely to said first rectangular transmission mask and defines a region where said rectangular transmission masks intersect having a height or depth equal to the sum of the heights or depths of each of said first and second rectangular transmission masks.

19. The assembly according to claim 1, wherein said forming means and said masking member are an integral element.

20. The assembly according to claim 1, wherein said forming means is a lens selected from the group consisting of refractive and diffractive lenses and said masking member includes a quadratic phase variation element which is dimensionally smaller than said dimension of said beam.

21. The assembly according to claim 1, wherein said forming means is a lens having an optical axis extending therethrough to said point said lens being disposed along said axis between said laser beam source and said masking member.

22. The assembly according to claim 1, wherein said source provides said beam with an essentially Gaussian profile along said scanning direction and said forming means translates an optical field due to said beam in a plane through which said beam is launched which field is expressed by the following mathematical model:

$$S(x) = e^{-(\frac{x}{\omega})^2} \left[ e^{-i(\frac{\pi x^2}{\lambda f})} \Omega\left(\frac{x}{s}\right) - e^{-i(\frac{\pi x^2}{\lambda f})} \Omega\left(\frac{x}{\gamma s}\right) + A e^{-i(\frac{\pi x^2}{\lambda \xi f})} \Omega\left(\frac{x}{\gamma s}\right) \right]$$

wherein S(x) is the optical field amplitude and the phase of the beam in the scanning direction with a center region presenting a change of phase through which said beam passes, x is the coordinate in the scanning direction of the beam, ω is the Gaussian half width of said beam on each side of said center where the amplitude of said beam reduces to 1/e of the amplitude thereof at said center where e is the base of natural logarithms, s is the half width of said masking member, f is the distance between said plane and said point, γ is a factor not exceeding unity such that γs is the half width of the region, ξ is a factor representing a shift in said point along said axis and does not exceed unity and Ω is one or zero when the function (x/s) or (x/γs) does not exceed one or is more than one, respectively, (x/s) representing the half width of said forming means in the scanning direction and (x/γs) representing the half width of said region, and A is a complex valued factor representing the transmissivity and phase advance or delay of said region in radians.

23. The assembly according to claim 22, wherein said at least one transmission mask comprises rectangular, generally transmissive material having a transmissivity represented by A, a width represented by γs and power represented by ξ, when A and ξ are different than one.

* * * * *